United States Patent [19]

Shapiro

[11] 4,165,646

[45] Aug. 28, 1979

[54] ADJUSTABLE MICRO-DISPENSING LIQUID PIPET

[76] Inventor: Justin J. Shapiro, 620 Hearst Ave., Berkeley, Calif. 94710

[21] Appl. No.: 928,080

[22] Filed: Jul. 26, 1978

[51] Int. Cl.$^2$ .............................................. G01N 1/14

[52] U.S. Cl. .................................... 73/425.6; 222/309

[58] Field of Search ............... 73/425.6, 425.4 P, 1 H; 222/309

[56] References Cited

U.S. PATENT DOCUMENTS

| | | | |
|---|---|---|---|
| 3,810,391 | 5/1974 | Suovaniemi | 73/425.6 |
| 3,815,790 | 6/1974 | Allen et al. | 222/309 |
| 3,831,602 | 8/1974 | Broadwin | 222/309 X |
| 3,921,864 | 11/1975 | Dawes | 222/309 X |
| 3,982,899 | 9/1976 | Kelm | 222/309 X |
| 4,023,716 | 5/1977 | Shapiro | 222/309 |

*Primary Examiner*—Daniel M. Yasich
*Attorney, Agent, or Firm*—Herman L. Gordon

[57] ABSTRACT

A liquid micro-dispenser consisting of a barrel with a snap-on dispensing tube tip at one end containing a dispensing plunger attached to an operating shaft extending through and having an abutment ring engageable with an adjustable stop bushing threadedly engageable within the other end of the barrel. The bushing has a locknut engageable with said other end of the barrel to lock the bushing adjustment, thus locking the adjusted intake volume of the dispensing tip. A square-flanged top bushing is secured to the upper end of the stop bushing, and a protective sleeve member is secured to the top bushing and surrounds the stop bushing and the upper portion of the barrel. The barrel has a volume scale visible through a volume-indicating window in the sleeve member. The sleeve member has a large cutaway aperture providing access to the locknut to allow it to be manually loosened for adjusting the volumetric setting, and for subsequently re-tightening the locknut. A coiled spring in the lower portion of the barrel biases the operating shaft upwardly to retract the dispensing plunger in the dispensing tip.

11 Claims, 13 Drawing Figures

ADJUSTABLE MICRO-DISPENSING LIQUID PIPET

This invention relates to syringe-type pipets, and more particularly to a micro-dispensing positive-displacement pipet of the type employing a snap-on precision dispensing tube tip and having a dispensing plunger whose retracted intake position may be adjusted to provide an accurately preset delivery volume.

A main object of the invention is to provide an improved dispensing pipet whose delivery volume can be accurately preset, and wherein the preset volume can be locked in a manner such that it will not be disturbed or altered during the operation of the pipet, or during transportation or storage.

A further object of the invention is to provide an improved micro-dispensing liquid pipet which is simple in construction, which is easy to operate, which can be easily adjusted as to dispensing volume, and which maintains a preset dispensing volume over long periods of repeated use.

A still further object of the invention is to provide an improved micro-dispensing liquid pipet of the type employing an adjustable threaded volume-determining stop bushing for establishing a preset dispensing volume and a locknut for locking the bushing adjustment, and including means to accurately read the dispensing volume adjustment, said means also serving to substantially protect the locknut against accidental loosening, while affording easy access thereto when readjustment of the dispensing volume is desired.

A still further object of the invention is to provide an improved micro-dispensing liquid pipet of the type employing a snap-on dispensing tip and having a calibrated barrel with an adjustable threaded volume-determining stop bushing cooperable with abutment means on the pipet operating shaft to establish an adjusted dispensing volume, the pipet having improved protective guard means to maintain the integrity of the stop bushing adjustment, as well as facilitating the reading of the barrel scale calibrations, while protecting said scale calibrations from obliteration or erasure by rubbing contact with the user's fingers.

A still further object of the invention is to provide an improved micro-dispensing liquid pipet of the type employing changeable snap-on dispensing tips, which is adjustable in delivery volume in accordance with the dispensing volume of the particular snap-on tip employed.

Further objects and advantages of the invention will become apparent from the following description and claims, and from the accompanying drawings, wherein:

Figure 9:
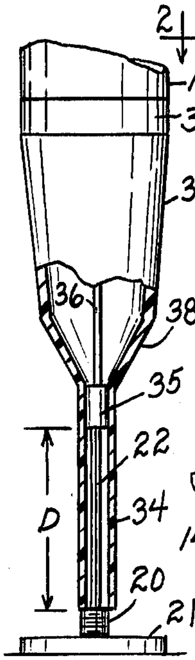
FIG. 9 is a fragmentary elevational view, partly in cross-section, of the lower tip portion of a pipet of the present invention, illustrating the use of the combination set screw-engaging tool and calibration rod for calibrating the pipet.

Referring to the drawings, 11 generally designates a typical embodiment of an improved liquid micro-dispenser according to the present invention. The micro-dispenser 11 is generally of the type shown in U.S. Pat. No. 4,023,716 to Justin Joel Shapiro, issued May 17, 1977, and comprises a main barrel 12 in the upper portion of which is threadedly engaged an adjustable tubular stop bushing 13. Adjustably secured on the top end of tubular bushing 13, as by a set screw 14, is a bushing 15 having a generally square flange 16, which is employed as a lower finger grip.

Designated at 17 is a solid operating shaft which extends slidably through the central aperture of bushing 15 and axially through bushing 13 and barrel 12. Secured on the top end of shaft 17, for example by a set screw 18, is a bushing 19. Threadedly engaged in the bushing 19 is a screw member 20 having the enlarged flange or head 21. Screw member 20 is provided with the depending hexagonal driving stem or rod 22 normally housed in an axial recess 23 formed in the top portion of shaft 17. The driving stem 22 is shaped to be drivingly engageable with the set screws 14 and 18, and is also employed as a dispensing total volume calibration rod, as will be presently described.

Stop bushing 13 is provided with a ring-shaped locknut 24 for clamping engagement with the top rim of barrel 12, whereby bushing 13 may be locked in rotationally and axially adjusted position relative thereto. Secured coaxially on bushing 15 is a depending outer guard sleeve 25, of substantial length, which surrounds the stop bushing 13 and the upper portion of barrel 12. The guard sleeve 25 has a large cut-away aperature 26 providing access to the locknut 24 to allow it to be manually loosened for adjusting the volumetric delivery setting, as will be presently described, and for subsequently retightening the locknut. For example, the aperture 26 may have an angular width of about 180° and may extend vertically approximately for the distance between the bottom rim of bushing 15 and the bottom end of stop bushing 13.

Figure 6:
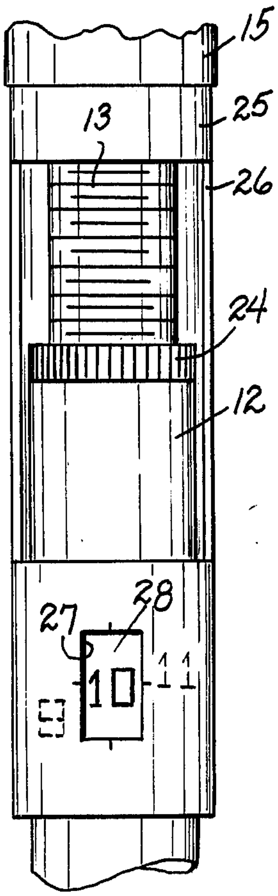
FIG. 6 is an enlarged fragmentary elevational view taken substantially on line 6—6 of FIG. 3.
Figure 5:
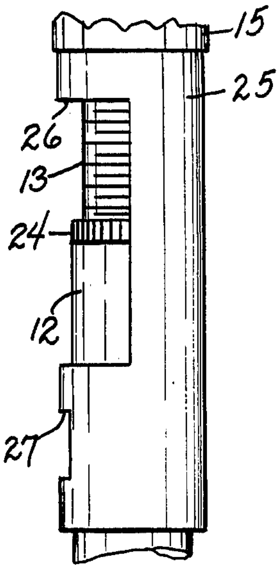
FIG. 5 is a fragmentary side elevational view taken substantially on line 5—5 of FIG. 1.

The portion of guard sleeve 25 below the locknut access opening 26 is provided with a viewing window 27 defining an index means for indicating an adjusted delivery volume value on a numerical scale 28 inscribed on barrel 12. For example, one and one-fifth turns of stop bushing 13 relative to barrel 12 may provide one integer of volumetric delivery change (1 microliter, for example). The volume numbers of the scale are therefore helically arranged on the barrel 12, as shown in FIG. 6, and are angularly spaced 0.2 of a turn. Thus, each scale number, as it passes through 0.2 of a turn relative to window 27, represents 1/6 of a microliter delivery volumetric change.

Secured on shaft 17 inside barrel 12 is an abutment collar 28′ engageable with the bottom end of stop bushing 13 to limit the upward travel of the shaft. Secured on shaft 17 below collar 28′ is a spring abutment collar 29 against which bears the upper turn of a coiled spring 30 surrounding shaft 17 and bearing at its bottom turn on an abutment bushing 31 secured in the bottom end of barrel 12 and slidably receiving the shaft 17. A somewhat resilient snap-on dispensing tip 32 with an inwardly-directed integral locking rib element 39, as described in U.S. Pat. No. 4,023,716, is detachably lockingly engaged on the annularly grooved reduced bottom end portion 33 of bushing 31. The dispensing tip 32 has a precision-bore discharge tube 34 of selected length in accordance with a desired maximum liquid delivery volume. A discharge plunger 35 is engaged in the tube 34, being connected to the bottom end of shaft 17 by a rigid axial connecting rod 36.

Figure 1:
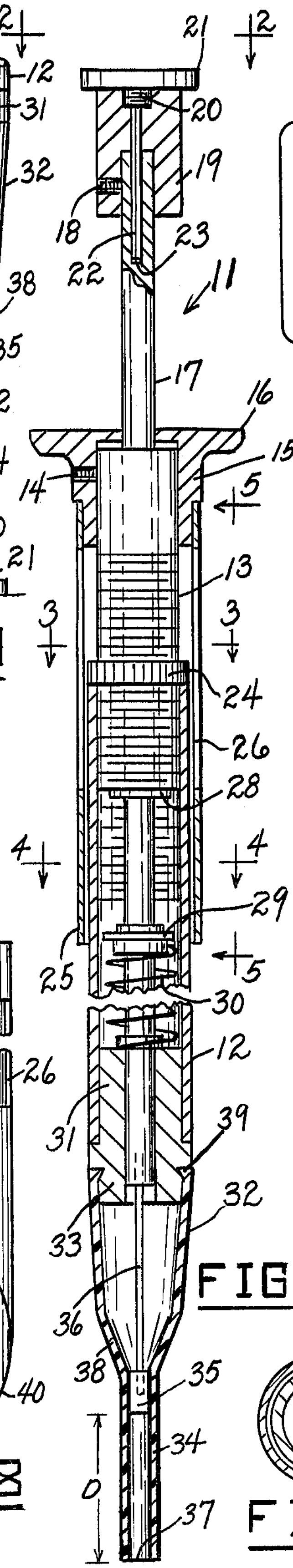
FIG. 1 is a longitudinal cross-sectional view taken through an improved micro-dispensing liquid pipet constructed in accordance with the present invention.
Figure 2:
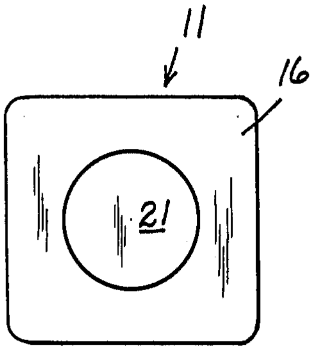
FIG. 2 is an enlarged top plan view taken substantially on line 2—2 of FIG. 1.
Figure 3:
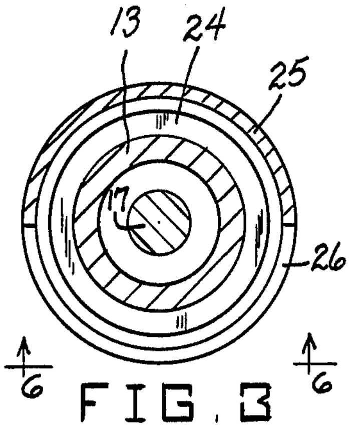
FIG. 3 is an enlarged horizontal cross-sectional view taken substantially on line 3—3 of FIG. 1.

Spring 30 biases shaft 17 upwardly toward a position wherein collar 28′ abuts against the bottom end of stop bushing 13, placing plunger 35 in the top end of tube 34. The intake liquid volume is then proportional to the height of plunger 35 above the bottom orifice 37 of tube 34, represented by D in FIG. 1.

As in U.S. Pat. No. 4,023,716, the downward travel of shaft 17 is limited by the engagement of its bottom end with the shoulder means defined by the conical portion 38 of tip 32, and the tip may be disengaged from its snap-fit engagement on bushing bottom end portion 33 by exerting extra downward force on push member 21, as described in said U.S. Pat. No. 4,023,716.

In normal operation, plunger 35 is depressed to the bottom of tube 34 by manually depressing push member 21 relative to finger grip flange 16, inserting the tube 34 into the liquid supply receptacle, releasing push member 21 to allow the tube 34 to be filled with liquid by suction, conveying the pipet to the receiving receptacle, and then discharging the metered quantity of liquid by depressing plunger 35 to the bottom orifice 37 of tube 34 by means of push member 21.

The limit of upward travel of the plunger 35 may be adjusted from a position of zero delivery (where plunger 35 is normally held at the tip orifice 37) to a position of maximum delivery (as in FIG. 1) at the upper end of the precision bore of tube 34. As the bushing 13 is advanced namely, as it is rotated by means of flange 16 to move it axially relative to barrel 12, the numerical volumes on scale 28 appear through the window 27 in guard cylinder 25. Said guard cylinder 25 may be of transparent material where all of the scale is visible but where only the set volume appears precisely in the outlined window 27. Alternatively, cylinder 25 may be of opaque material where only the set volume appears in the window 27, but where much of the scale 28 is normally hidden by the extension of the opaque cylinder below window 27.

Calibration of the instrument is performed by adjusting the insertion depth of the bushing 13 into the finger grip bushing 15, and locking the adjustment by means of set screw 14. Alternatively, the cylindrical sleeve 25 (or 45 in FIG. 10) may be adjustably secured to finger grip bushing 15 (or 42 in FIG. 10) and the threaded bushing 13 (43 in FIG. 10) may be permanently attached to finger grip bushing 15 (or 42 in FIG. 10). The window 27 in sleeve 25 (or notch 41 in FIG. 10) indicates, on scale 28, the set volume when the instrument is properly calibrated.

To calibrate, the adjustment tool 20,21,22 is detached from bushing 19. The length of the hexagonal rod 22, up to threaded hub 20, is the calibration distance D (FIG. 9) from pipet orifice 37 to plunger 35 for delivery of the maximum precision volume of tube 34. The rod 22 is inserted its full length through the orifice 37, as shown in FIG. 9. With the locknut 24 loosened, the finger grip bushing 15 is turned until, with the hub 20 in contact with orifice 37, the top end of rod 22 is in contact with plunger 35. The locknut 24 is then screwed against the rim of barrel 12, locking the bushing 13 relative to barrel 12 in position for maximum precision delivery. The tool 20,21,22 is now used to loosen set screw 14, freeing the cylinder 25 and finger grip bushing from the threaded bushing 13. The cylinder 25 is now rotated and/or moved axially until the calibrated volume appears in the index window 27. The required calibrated relative normal axial position of plunger 35 with respect to bushing 15 may now be locked with tool 20,21,22 by tightening set screw 14.

When the precision bore of tube 34 is smaller in diameter than the diameter of rod 22, a wire of suitable diameter (as in U.S. Pat. No. 4,023,176) and of calibrated length may be used instead of tool 20,21,22.

The guard sleeve 25 acts to substantially prevent accidental loosening of the locknut 24, while affording access thereto for intended readjustment of delivery volume. Said guard sleeve also protects the scale 28 and prevents erasure or obliteration of the scale numbers by substantially preventing the user's fingers from coming into rubbing or frictional contact with said numbers.

Figure 8:
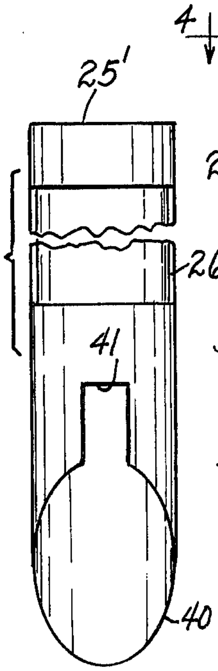
FIG. 8 is a fragmentary front elevational view of the modified guard sleeve of FIG. 7.
Figure 4:
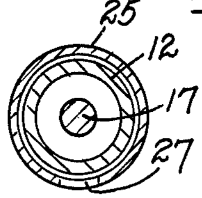
FIG. 4 is a horizontal cross-sectional view taken substantially on line 4—4 of FIG. 1.
Figure 7:
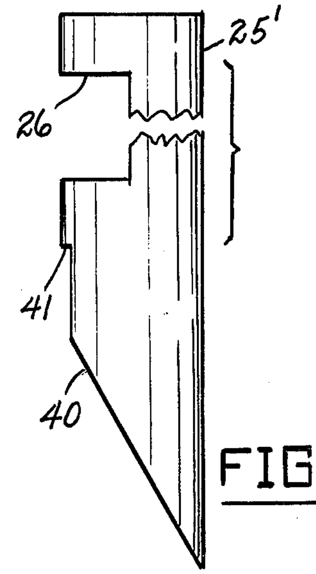
FIG. 7 is a fragmentary side elevational view of a modified protective guard sleeve and scale indicator which may be employed in a liquid pipet according to the present invention.

A modified form of guard sleeve is shown at 25′ in FIGS. 7 and 8. The modified guard sleeve 25′ has an obliquely cut bottom rim 40 which merges at its top with a rectangular window notch 41, serving the purpose of selectively viewing the respective numbers of the volumetric adjustment scale 28.

Figure 10:
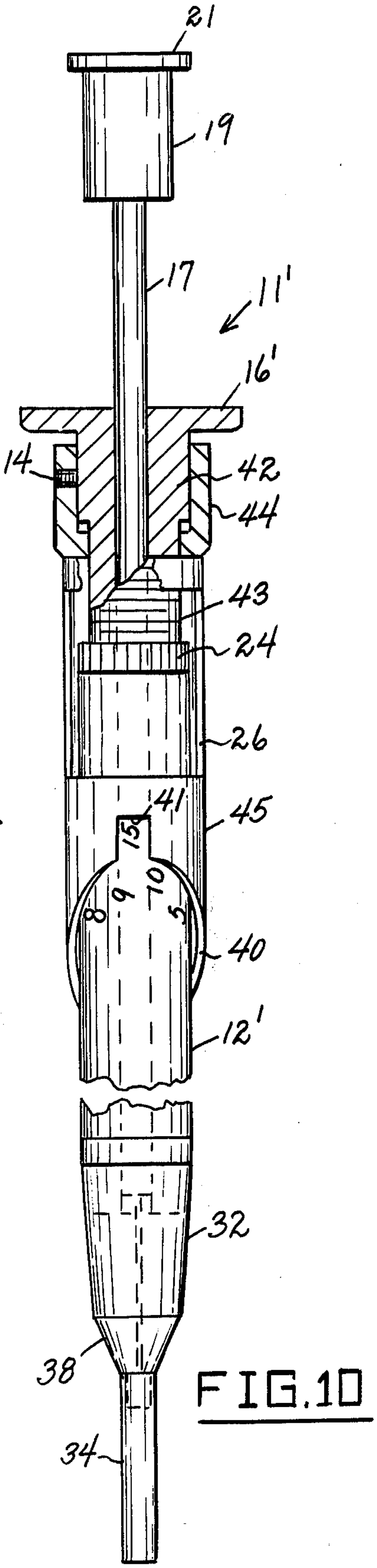
FIG. 10 is a front elevational view, partly broken away, of a modified form of liquid pipet according to the present invention.
Figure 13:
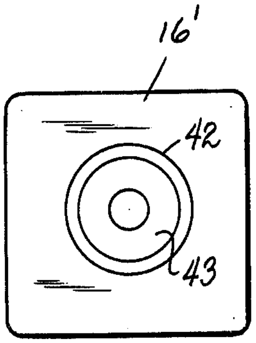
FIG. 13 is a bottom view taken on the line 13—13 of FIG. 11.
Figure 11:
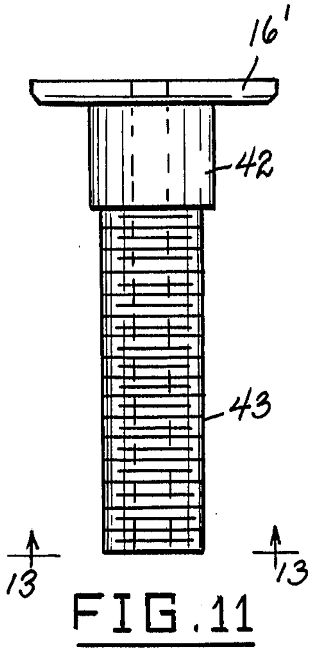
FIG. 11 is an elevational view of the combined finger grip member and adjustable stop bushing used in the pipet of FIG. 10.
Figure 12:
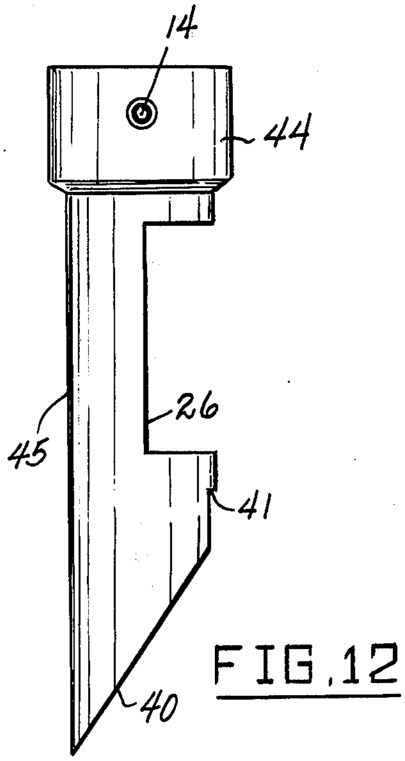
FIG. 12 is a side elevational view of the guard shield member employed in the pipet of FIG. 10.

In the modified form of liquid pipet shown in FIG. 10, designated generally at 11′, the finger grip flange 16′ and bushing element 42 are integrally formed with the stop bushing element, shown at 43. The guard shield element, shown at 45, is generally similar to that of FIGS. 7 and 8 but is provided at its top end with an enlarged integral bushing portion 44 which is telescopically and adjustably engageable on the bushing element 42 and is provided with the adjustment-locking set screw 14, allowing longitudinal and rotational adjustment of the sleeve 45 relative to the finger grip portion of the assembly. The main barrel, shown at 12′, has a helical volumetric scale whose numbers can be selectively located in the window notch 41 of guard sleeve 45.

While certain specific embodiments of an improved adjustable micro-dispensing liquid pipet have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A pipet comprising a main barrel having opposite end portions and provided with an axial operating shaft slidably engaged in the barrel to actuate means for filling and dispensing liquid relative to the barrel, a dispensing tip connected to one end portion of said main barrel, said dispensing tip comprising a barrel-coupling portion and a conduit portion, plunger means operatively engaged in said conduit portion, means coaxially connecting said plunger means to said shaft, whereby the plunger means can be reciprocated by reciprocating the shaft, adjustable elongated stop bushing means threadedly engaged coaxially in said barrel at the end portion thereof opposite said dispensing tip, locknut means on the stop bushing means engageable with the barrel to releasably lock the adjustment of the stop bushing means relative to the barrel for adjusting volumetric delivery of liquid therefrom, finger grip means secured on said stop bushing means, guard shield means secured to said finger grip means and substantially surrounding said stop bushing means, said guard shield means having an enlarged opening providing access for loosening and tightening said locknut means, spring means biasing said operating shaft in a direction to retract said plunger means in said conduit portion, and abutment means on said shaft engageable with said stop bushing means to limit retraction of said plunger means.

2. The pipet of claim 1, and wherein said barrel is provided with a volumetric scale, and index means on the guard shield means cooperable with said scale.

3. The pipet of claim 2, and wherein said index means comprises an opening formed in the guard shield means to define a scale-viewing aperture.

4. The pipet of claim 2, and wherein said scale comprises circumferentially spaced volumetric indicia inscribed on the barrel.

5. The pipet of claim 4, and wherein said indicia comprises consecutive numbers arranged helically on the barrel.

6. The pipet of claim 1, and means to adjust the position of said finger grip means relative to said stop bushing means.

7. The pipet of claim 1, and wherein said guard shield means is substantially cylindrical and said enlarged opening subtends an angle of approximately 180°.

8. The pipet of claim 1, and wherein said guard shield means extends substantially coaxially over a portion of said barrel, said barrel portion being provided with a volumetric scale comprising circumferentially spaced indicia, said guard shield means being formed with additional aperture means shaped to selectively expose the indicia.

9. The pipet of claim 1, and wherein said dispensing tip is of the snap-fit type provided with an inwardly directed locking rib at its top rim lockingly engageable with said main barrel.

10. The pipet of claim 1, and wherein said finger grip means is telescopically engageable on the top portion of said stop bushing means and is provided with set screw means clampingly engageable with the stop bushing means to lock the finger grip means in an adjusted position thereon.

11. The pipet of claim 1, and wherein said barrel is provided with a helical volumetric scale and index means on the guard shield means cooperable with said scale, said scale comprising consecutive numbers separated by equal peripheral angles, with an integer of volumetric delivery change being represented by an integral number of such angles, and a complete turn of the guard shield means requiring one less than said integral number of such angles.

* * * * *